United States Patent
Honma

[19]

[11] Patent Number: 6,009,095

[45] Date of Patent: Dec. 28, 1999

[54] DIGITAL PB EXCHANGER WITH MULTI-PROCESSOR CONTROL SYSTEM USING ASYNCHRONOUS TRANSFER MODE

[75] Inventor: Yoshio Honma, Tokyo, Japan

[73] Assignee: NEC Corporation, Tokyo, Japan

[21] Appl. No.: 08/657,769

[22] Filed: May 31, 1996

[30] Foreign Application Priority Data

May 31, 1995 [JP] Japan .................................. 7-133654

[51] Int. Cl.⁶ .................................................. H04L 12/56
[52] U.S. Cl. ................................................................ 370/395
[58] Field of Search ..................................... 370/396, 395, 370/392, 389, 400, 401, 465, 466, 467, 474, 442, 437, 458, 375, 376, 372, 370, 369, 359, 358; 379/94–98; 455/554, 555

[56] References Cited

U.S. PATENT DOCUMENTS

| | | | |
|---|---|---|---|
| 5,513,174 | 4/1996 | Punj | 370/412 |
| 5,553,057 | 9/1996 | Nakayama | 370/395 |
| 5,570,355 | 10/1996 | Dail et al. | 370/395 |
| 5,583,858 | 12/1996 | Hanaoka | 370/395 |
| 5,623,491 | 4/1997 | Skoon | 370/466 |

FOREIGN PATENT DOCUMENTS

| | | |
|---|---|---|
| A 55-37025 | 3/1980 | Japan . |
| A 56-122588 | 9/1981 | Japan . |
| A 63-72293 | 4/1988 | Japan . |
| A 63-82055 | 4/1988 | Japan . |
| A 63-198499 | 8/1988 | Japan . |
| A 63-274252 | 11/1988 | Japan . |
| 2277340 | 11/1990 | Japan . |
| A 2277340 | 11/1990 | Japan . |
| A 3229598 | 10/1991 | Japan . |
| A 5211517 | 8/1993 | Japan . |
| A 5235992 | 9/1993 | Japan . |
| A 6244870 | 9/1994 | Japan . |

*Primary Examiner*—Dang Ton
*Attorney, Agent, or Firm*—Sughrue, Mion, Zinn, Macpeak & Seas, PLLC

[57] ABSTRACT

The present invention provides a Digital PB exchanger with a Multi-processor control system by using an ATM for a plurality of Digital PB exchangers with a single processor control system to multiplex PCM voice data and communication data between processors. The Digital PB exchanger consists of a Processor unit, a Time division switch, a subscriber circuit, a trunk circuit, a telephone terminal and the like. A PCM voice signal and data from the Time division switch 21 are connected to the ATM switch 5 via the ATM interface circuit 31 so that communication of the audio signal can be made possible. Furthermore, when data is transmitted from one processor to another processor, the data from the processor is multiplexed with the audio signal by the ATM interface circuit and is transmitted to other ATM interface circuits.

2 Claims, 4 Drawing Sheets

DIGITAL PB EXCHANGER WITH MULTI-PROCESSOR CONTROL SYSTEM USING ASYNCHRONOUS TRANSFER MODE

BACKGROUND OF THE INVENTION

1. Field of the Invention

The present invention relates to a digital PB exchanger with a Multi-processor control system, and more particularly to a Digital PB exchanger using an Asynchronous transfer mode (hereinafter, referred to as an ATM) for data transferring between processors.

2. Description of the Related Art

FIG. 1 is a general block diagram showing a connection between processors in a conventional Digital PB exchanger with the Multi-processor control system. A conventional Digital PB exchanger with a Multi-processor control system consists of a plurality of Processor units 71 to 76 for load sharing and function sharing. The Digital PB exchanger comprises bus 7, used exclusively for data Communication between processors, as means for performing data transmitting between processors and Bus interface circuits 81 to 86 between processors which provide an interface between the bus used exclusively for data Communication between processors and Processor units 71 to 76. In addition, buses which are used exclusively for connections between Time division switches 91 to 94 and Space division switch 6 are arranged. Thus, the Digital PB exchanger with a Multi-processor control system is realized by these components.

FIG. 2 is a block diagram showing a conventional Connection system between processors, which is disclosed in Japanese Patent Application Laid Open Tokkaihei 2-277340. The conventional Connection system between processors shown in FIG. 2 is constituted by connecting a plurality of Processors 100 to 10n to ATM switch 200. Each of Processors 100 to 10n includes an ATM interface circuit, and is connected to ATM switch 200 via the ATM switch interface circuit. Thus, the Connection system between processors shown in FIG. 2 realizes data communication between processors.

The first problem involved in the prior art is that the conventional Digital PB exchanger with the Multi-processor control system requires the bus for data communication and the buses for Time division switches 91 to 94, separately. The connections between the processors and ATM switch 220 are disclosed in the Japanese Patent Application Laid Open Tokkaihei 2-277340. The bus for data communications between processors has been merely disclosed in the prior art. However, the bus such as for the Time division switch, which is different from the bus for data communications between processors, has not been disclosed yet.

The reason for this is that the signal form and the transmitting speed are different between the bus for the data communication between processors and the bus for the connections for the Time division switches so that the Digital PB exchanger with the Multi-processor control system can not be realized by simply multiplexing.

The second problem involved in the prior art is as follows. The distance between the bus used for data communication between processors and the bus used for the connections for the Time division switches can not be set to be longer so that the buses must be installed in a single system and it is impossible to use them extending over more than two systems. The reason of the presence of the second problem is that the communication speed of both of the aforementioned buses is high and communication trouble such as bit error might be caused unfortunately in case of long distance between the buses.

SUMMARY OF THE INVENTION

The object of the present invention is to provide a Digital PB exchanger with a Multi-processor control system by transmitting, using an Asynchronous transfer mode, PCM voice and data to a Digital PB exchanger composed of more than two single processor systems, and by multiplexing Communication data between processors.

Another object of the present invention is to solve the above described problems of the prior art, and to make it possible to perform system establishment for all of the slave Digital PB exchangers from a master Digital PB exchanger.

To achieve the above objects, in a Digital PB exchanger with a Multi-processor control system of the present invention using an Asynchronous transfer mode, a first Digital PB exchanger comprises an ATM interface circuit which performs ATM coding for a PCM voice signal and a data signal from a Time division switch and a control signal from a Processor unit to transmit them to an ATM switch, and an ATM interface circuit which decodes a cell of ATM coded data from the ATM switch into the PCM voice signal, the data signal, and the control signal, and transmits the decoded PCM voice signal and data signal to the Time division switch and the control signal to the Processor unit, and a second Digital PB exchanger comprises, similarly to the first Digital PB exchanger, an ATM interface circuit, wherein the first and second Digital PB exchangers are connected with the ATM switch incorporated in the first Digital PB exchanger.

As a preferred embodiment of the present invention, the first Digital PB exchanger serving as a master Digital PB exchanger comprises a Main memory for storing data, input by a maintenance operator of the Digital PB exchanger, to perform system establishment, an External memory such as a magnetic memory device, an External memory interface circuit serving as an interface between the External memory and a CPU, and an ATM interface circuit which performs an ATM coding for the data from the CPU to transmit it to an ATM switch and decodes a cell from the ATM switch into data for the CPU and transmits the decoded data to the CPU, and a second Digital PB exchanger similar in constitution to that of the first Digital PB exchanger except for the ATM switch, wherein data, stored in the first Digital PB exchanger, to perform the system establishment is transmitted to the second Digital PB exchanger so that the system establishment can be performed.

Voice from a telephone terminal is subjected to a PCM coding by a subscriber circuit, and is input to the ATM interface circuit via a Time division switch. The PCM voice signal is changed to an ATM coded signal and is output to the ATM switch. A control signal from a processor is also changed to an ATM coded signal by the ATM interface circuit and is output to the ATM switch. The cell from the ATM switch is decoded into the PCM voice signal and the control signal. The PCM voice signal and the data signal are transmitted to the Time division switch and the control signal is transmitted to the processor. Further, the master Digital PB exchanger transmits the system establishment data stored therein via the processor in the foregoing manner whereby the system establishment for the plurality of Digital PB exchangers can be done by the single master Digital PB exchanger.

DESCRIPTION OF THE PREFERRED EMBODIMENT

An embodiment of the present invention will now be described with reference to the accompanying drawings.

Figure 1:
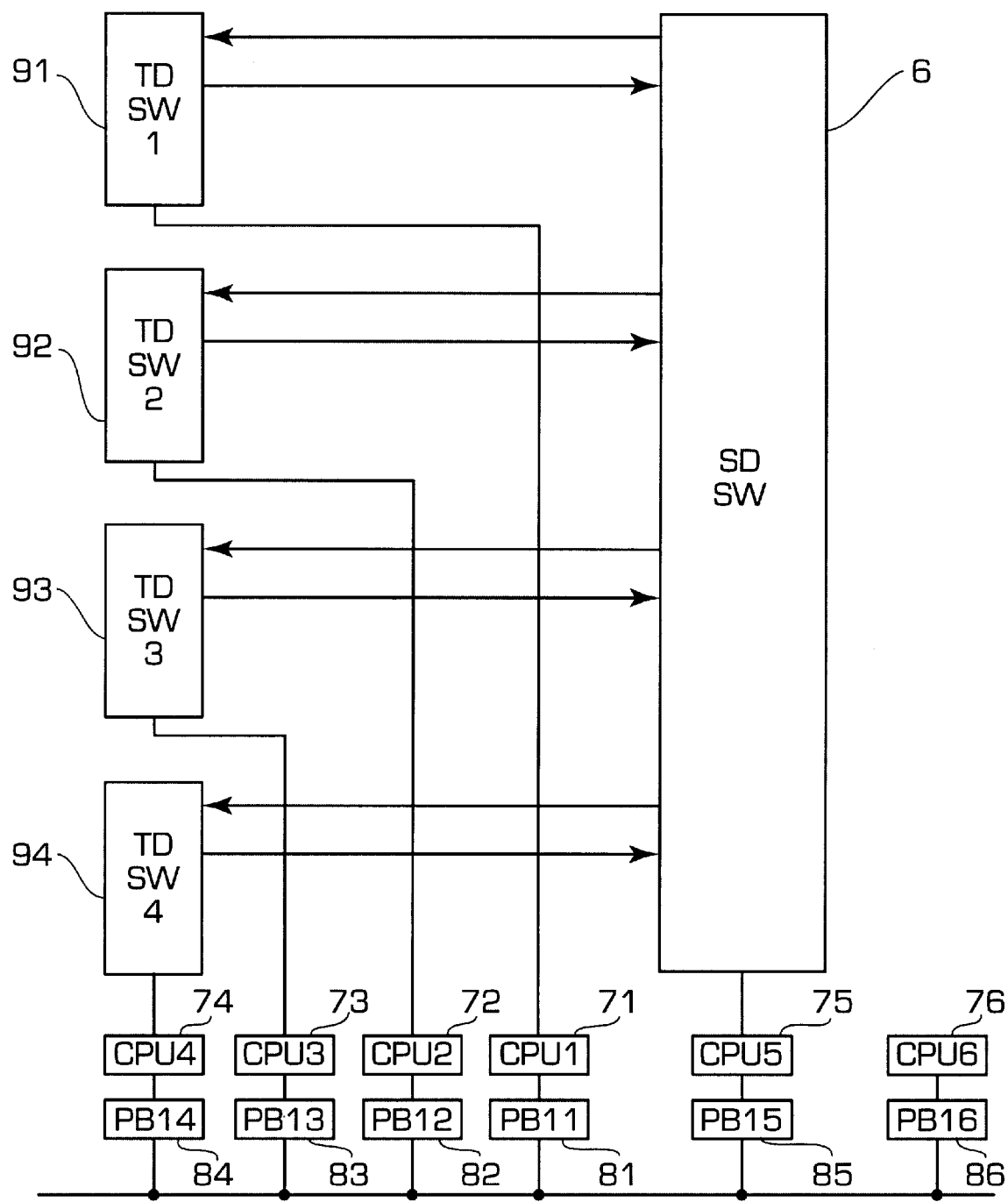
FIG. 1 is a block diagram showing a connection system of a conventional digital PB exchanger with a Multi-processor control system.
Figure 2:
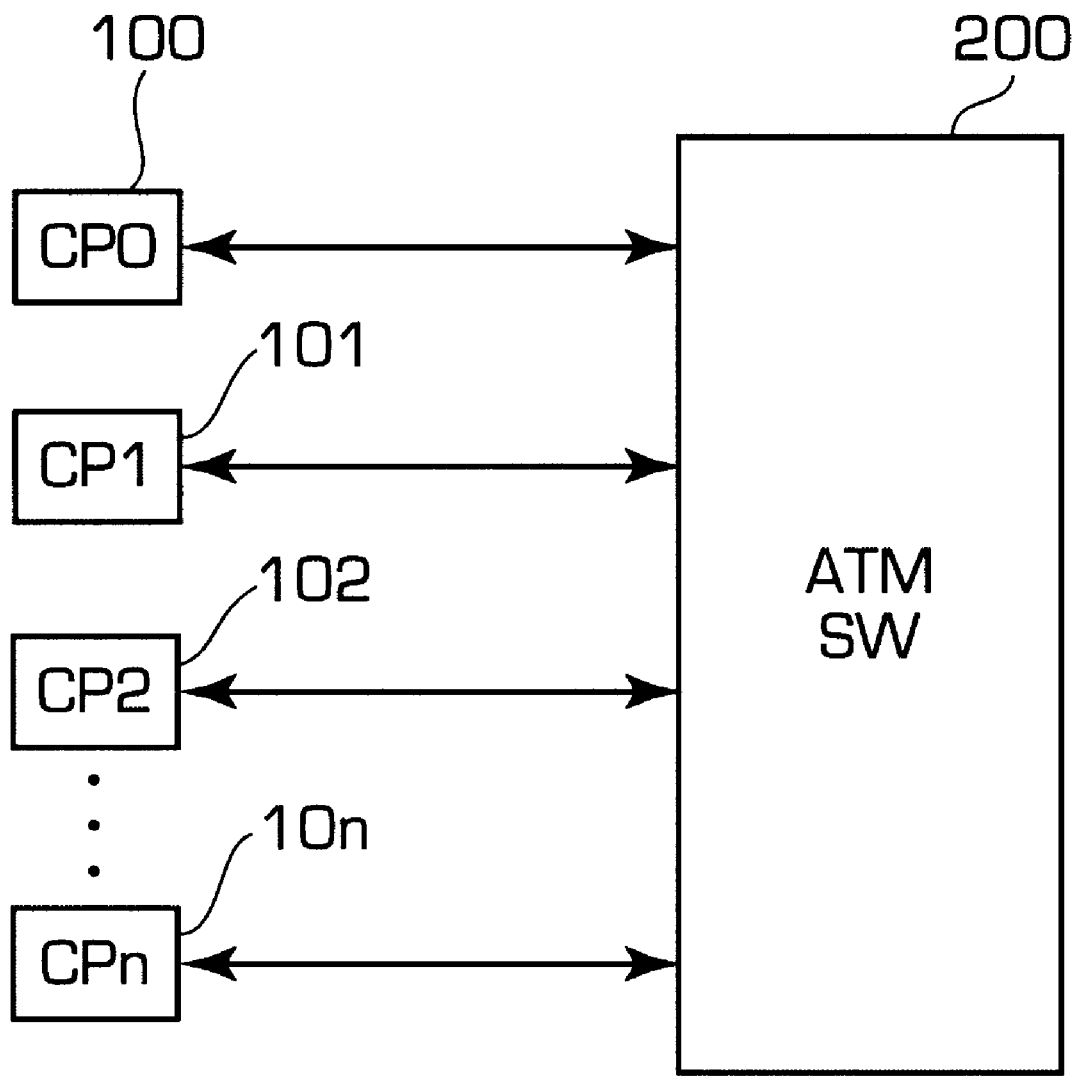
FIG. 2 is a block diagram of a Connection system between processor using a conventional an Asynchronous transfer mode.
Figure 3:
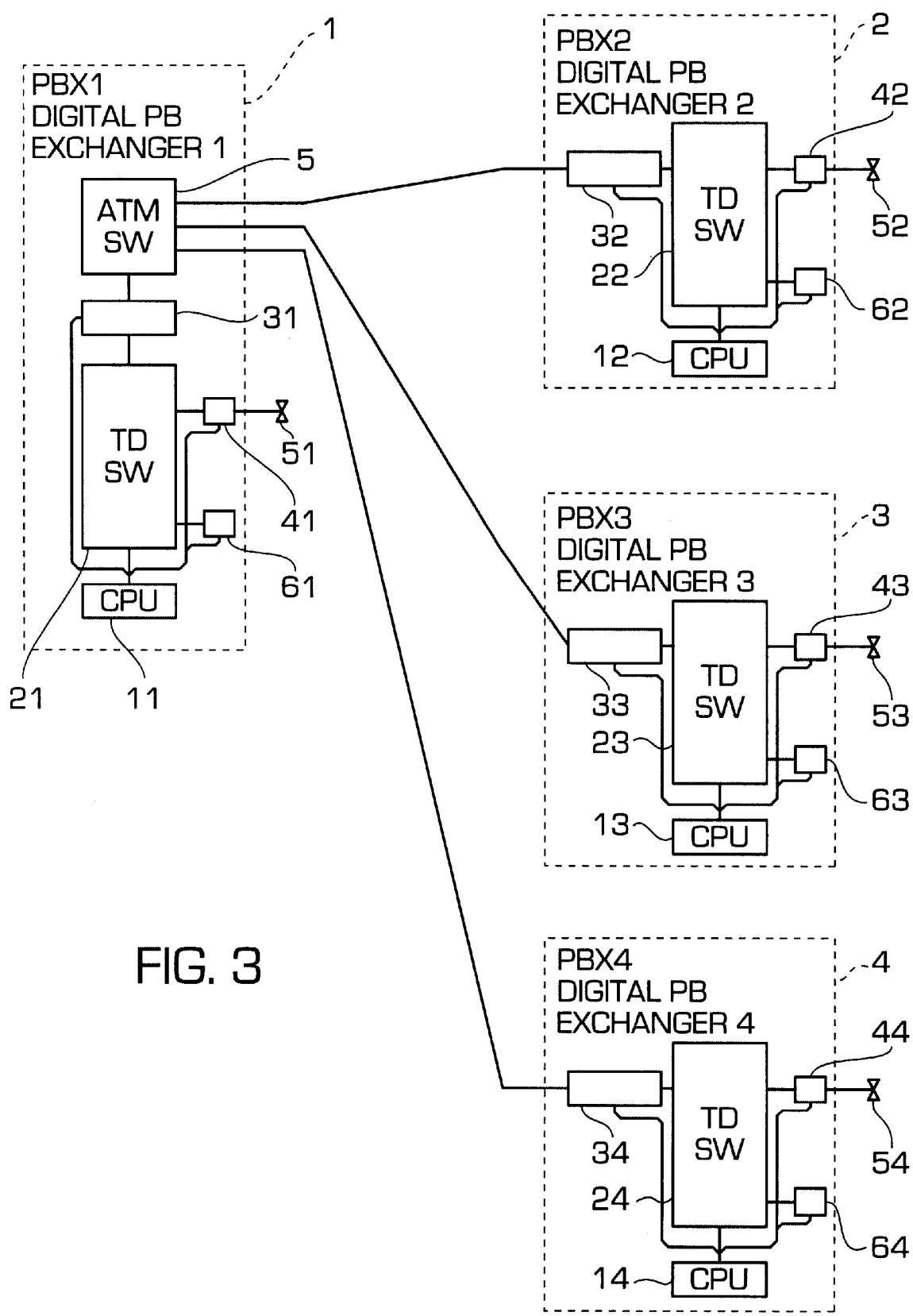
FIG. 3 is a block diagram for explaining an embodiment of a Digital PB exchanger with a Multi-processor control system using an Asynchronous transfer mode of the present invention.

FIG. 3 is a block diagram showing a Digital PB exchanger with a Multi-processor control system using an Asynchronous transfer mode.

Digital PB exchanger 1 consists of processor unit 11, Time division switch 21, subscriber circuit 41, trunk circuit 61, and telephone terminal 51, and the like. Other Digital PB exchangers 2 to 4 have the same constitution as exchanger 1. Digital PB exchanger 1 alone serving as a master is provided with ATM switch 5. In general, a Digital PB exchanger connected to a small number of lines uses a single processor system in which a single processor controls the whole of the Digital PB exchanger. On the other hand, a Digital PB exchanger connected to a large number of lines uses a multi-processor system in which a plurality of processors controls the Digital PB exchanger.

Here, a transmitting/receiving method of control data and PCM voice signals between Digital PB exchanger (master) 1 and Digital PB exchanger (slave) 2 will be described as an embodiment of the present invention.

PCM voice signals and data signals from Time division switch 21, incorporated in Digital PB exchanger 1 using a single processor system where a single processor operates, are coupled to ATM switch 5 via ATM interface circuit 31, for connecting circuit 31 to ATM switch 5. Digital PB exchanger 1 is hereinafter referred to as the first Digital PB exchanger.

Further, PCM voice signals and data signals from Time division switch 22, incorporated in the other Digital PB exchanger 2, are coupled to ATM switch 5 via ATM interface circuit 32. Digital PB exchanger 2 is hereinafter referred to as the second Digital PB exchanger.

ATM interface circuits 31 and 32 perform ATM coding and an ATM decoding to enable Digital PB exchangers 1 and 2 to communicate the PCM voice signals and the data signals therebetween. Further, ATM interface circuit 31 is connected to Processor unit 11. ATM interface circuit 32 is connected to processor unit 12. When data transmitting from Processor unit 11 in first Digital PB exchanger 1 to Processor unit 12 in second Digital PB exchanger 2 is carried out, data from Processor unit 11 is previously subjected to an ATM coding by ATM interface circuit 31 in the same way as audio signals and data signals, and then transmitted to ATM switch 5. In ATM switch 5, the ATM coded data from first Digital PB exchanger 1 are subjected to exchange-processing according to an address indicated in a header thereof, and then transmitted to ATM switch interface circuit 32 of second Digital PB exchanger 2. The coded ATM signals transmitted to interface circuit 32 from Processor unit 11 of first Digital PB exchanger 1 are subjected to ATM decoding by interface circuit 32 and sent to Processor unit 12. Also, data communications between Processor units 11 and 12 are performed in the reverse direction in the same manner. This enables the Digital PB exchanger to perform mutual data communication between the Processor units. As described above, PCM voice, data, and data between Processor units are subjected to ATM multiplexing and transmitted by an ATM switch, whereby the Digital PB exchanger with the multiprocessor system is constituted.

Figure 4:
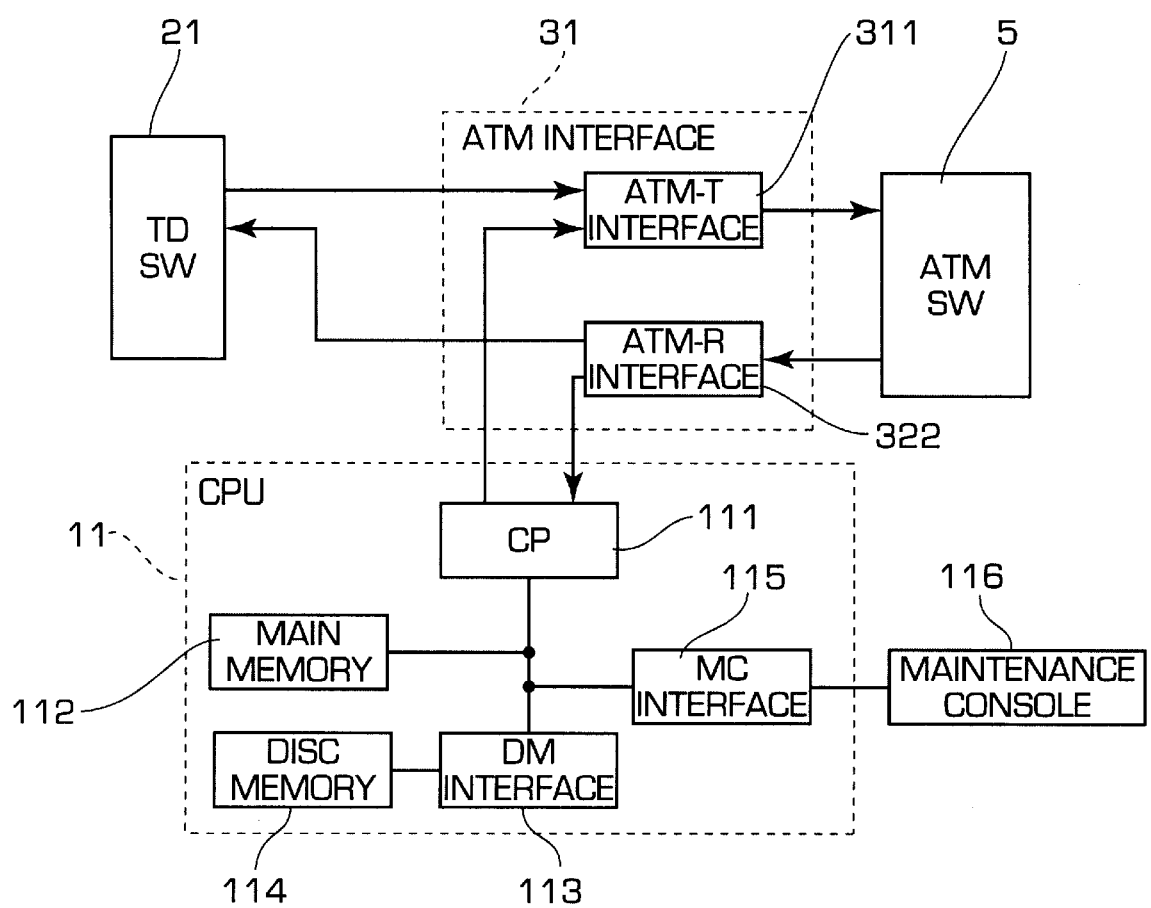
FIG. 4 is a block diagram of an ATM interface unit and a Processor unit.

FIG. 4 is a diagram showing connections between Processor units 11, ATM interface circuit 31, ATM switch 5, and Time division switch 21. With reference to FIG. 4, a way to establish the system of master Digital PB exchanger for the slave Digital PB exchanger is described.

Processor unit 11 of master Digital PB exchanger 1 consists of CPU 111, Main memory 112, External memory interface circuit 113, and External memory 114. Maintenance console 116 is connected to Maintenance console interface 115. CPU 111 is connected to ATM-Transmitter interface circuit 113 and ATM-Receiver interface circuit 322 of Processor unit 11. Also, Time division switch 21 and ATM switch 5 are connected to ATM interface circuit 31.

With such constitution, data for establishment of the system is input from Maintenance console 116 by an operator or the like. The input data is stored in Main memory 112 via Maintenance console interface 115 by instructions of CPU 111. The data stored in Main memory 112 is also stored in External memory 114, such as a magnetic memory via External memory interface circuit 113 by instructions from maintenance console 116 or by periodical processing of CPU 111. Data for system establishment stored in Main memory 112 is transmitted to ATM-transmitter interface circuit 311 by processing of CPU 111. The data transmitted to ATM-transmitter interface circuit 311 is subjected to ATM-coding by ATM-transmitter interface circuit 311, and transferred to the slave Digital PB exchanger via ATM switch 5. In the slave Digital PB exchanger which received the ATM-coded data, the ATM-coded data from ATM switch 5 is stored in the Main memory of the slave Digital PB exchanger in procedures reverse to those of the transmitter side. Thus, it follows that it is possible to establish the system establishment data for the slave Digital PB exchanger from the master Digital PB exchanger.

The Digital PB exchanger of the present invention is constituted as described above so that the following advantages can be expected.

The first advantage of the present invention is as follows. When a Digital PB exchanger having a large number of lines is constituted, the Digital PB exchanger adopts a Multiprocessor system. Hence, the Digital PB exchanger requires an interface circuit to perform data communication between the processors, a bus for data communication between the processors, and a control circuit to control them. Therefore, the constitution of the system is quite different from that of the Digital PB exchanger with the single processor system. The Digital PB exchanger with the Multi-processor control system can be constituted by adding an ATM interface circuit to the Digital PB exchanger with the Single-processor system. Therefore, simplification of the circuit and device constitutions can be realized. The reason for this is as follows. In the conventional Digital PB exchanger with the Multi-processor system a bus used exclusively for the Communication between the processors is arranged, this is subjected to ATM coding processing, and is multiplexed with audio data whereby a specific bus between processors peculiar to the Multi-processor control system and an interface circuit are not required.

The second advantage of the present invention is as follows. A plurality of Digital PB exchanger can be connected. By installing an ATM in an optical fiber it is possible to make the distance between the Digital PB exchangers longer. The reason is that optical fiber produces extremely little signal loss and the ATM signal system has a high affinity with the optical fiber.

The third advantage of the present invention is that the system establishment data which is input from the Maintenance console connected to the Digital PB exchanger serving as a master is transferred to the Digital PB exchanger serving as a slave, whereby all of system establishment is possible. This is because transfer of the system establishment data stored in the Main memory of the master Digital PB exchanger to the Main memory of the slave Digital PB exchanger becomes possible.

What is claimed is:

1. A digital PB exchanger system with multiple processor control systems, comprising a plurality of digital PB exchangers, each having an associated processor system including a processor unit for controlling the digital PB exchanger system, a time division switch for exchanging voice and data, subscriber circuits for serving as interface between telephone terminals and the time division switch, trunk circuits, and a telephone terminal;

wherein a first digital PB exchanger and a second digital PB exchanger each comprises an ATM interface circuit which performs ATM coding for a PCM voice signal from the time division switch, a data signal from the time division switch, and a control signal from the processor unit, to transmit the PCM voice, data and control signals to an ATM switch, and which decodes a cell of ATM-coded data from the ATM switch into a PCM voice signal, a data signal, and a control signal, and transmits the decoded PCM voice signal and data signal to the time division switch and the decoded control signal to the processor unit;

wherein the first and second digital PB exchangers are connected with the ATM switch, said ATM switch being incorporated in the first digital PB exchanger.

2. A digital PB exchanger system with a multi-processor control system using an asynchronous transfer mode according to claim 1, wherein the first digital PB exchanger serves as a master digital PB exchanger and the second digital PB exchanger serves as a slave, each of the digital PB exchangers comprises a main memory for storing data input by a maintenance operator of the digital PB exchanger to perform system establishment, an external memory, an external memory interface circuit serving as an interface between the external memory and a CPU, and the ATM interface circuit which performs ATM coding for the data from the CPU to transmit the coded data to the ATM switch and which decodes a cell from the ATM switch into data for the CPU to transmit the decoded data to the CPU, wherein data for system establishment stored in the first digital PB exchanger is transmitted by the ATM switch to the second digital PB exchanger to perform system establishment of the second digital PB exchanger serving as a slave from the first digital PB exchanger serving as a master.

* * * * *